July 28, 1936.  R. H. GIBBS  2,048,858
VALVE CONSTRUCTION
Filed July 7, 1934
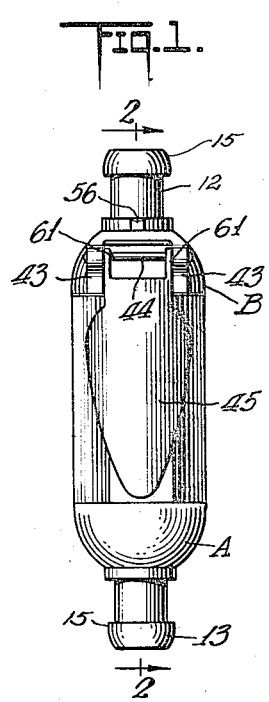
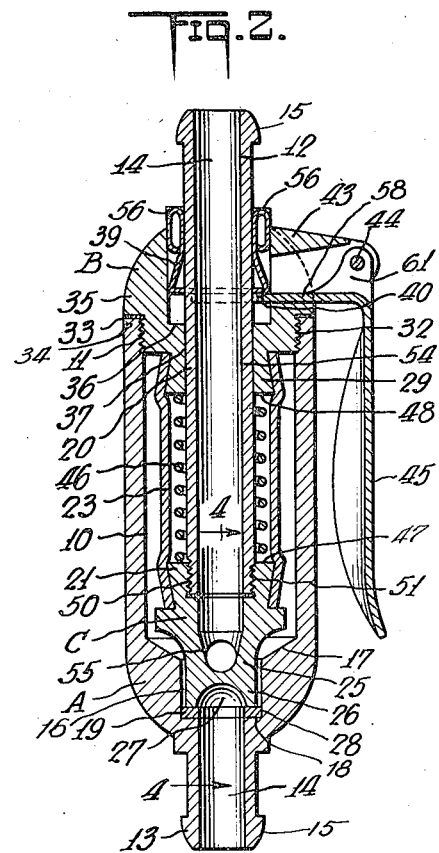
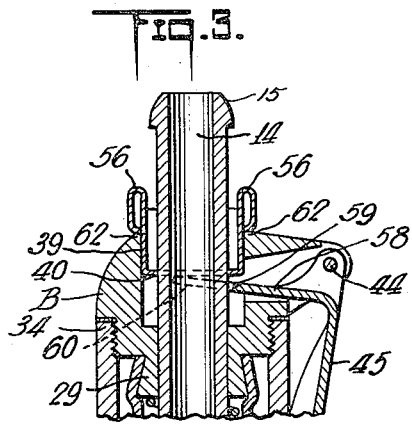
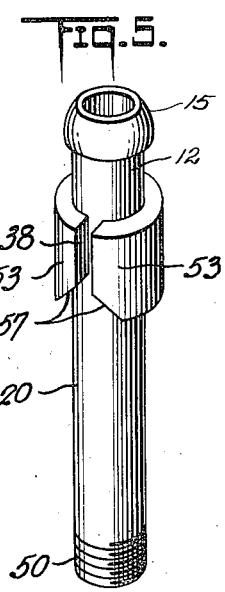
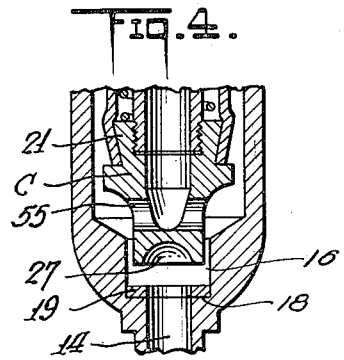
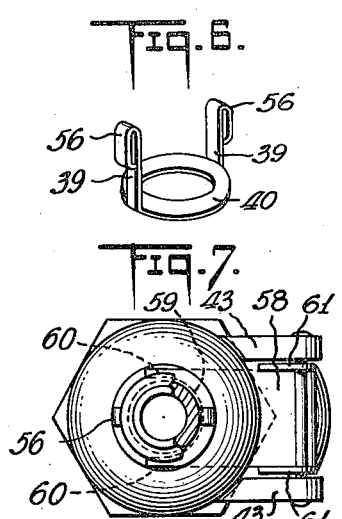
INVENTOR
Robert H. Gibbs
BY
ATTORNEY Patented July 28, 1936

2,048,858

UNITED STATES PATENT OFFICE 2,048,858

VALVE CONSTRUCTION

Robert H. Gibbs, Floral Park, N. Y., assignor of one-half to Margaret Blake, Garden City, N. Y.

Application July 7, 1934, Serial No. 734,125

9 Claims. (Cl. 251—115)

The present invention relates to a fluid control device and it particularly relates to a liquid control valve member.

Considerable difficulty has been encountered in making suitable valve members for controlling or valving the flow of fluid or liquid, particularly liquids of a corrosive and/or medicinal character.

Attempts have been made to provide valve means which would enable convenient control of the flow of liquids, particularly of a corrosive and/or medicinal nature from bottles, containers, or other dispensing apparatus but most of such devices generally necessarily employ exposed metal parts which prevent them from being utilized in the liquid conduit systems.

An object of the present invention is to provide an improved fluid valving device, particularly adapted for controlling the flow of corrosive and/or medicinal liquids, which will most satisfactorily function without binding or leakage, which will be of inexpensive construction and most readily manufactured and repaired, and which further will be devoid of metallic parts subject to attack which will change the chemical and/or medicinal character of the liquids.

Another object of the present invention is to provide a valve means adapted to be associated with liquid containers or to form part of liquid dispensing systems which will be reliable in operation, even though of simple and inexpensive construction.

In accomplishing the above objects, it has been found most satisfactory to make a valve member of the plunger type, the main structural elements of which may be molded of a plastic material, such as bakelite, hard rubber, and so forth.

In the preferred construction a resilient means is employed taking the form of a coil spring, but this metallic coil spring is enclosed at all times within a flexible casing member. This casing member preferably takes the form of a rubber tube and will permit ready reciprocation of the plunger valve.

In the copending application, Serial No. 711,652, filed February 17, 1934, now Patent No. 2,019,257, granted Oct. 29, 1935, there is disclosed a valve construction of this character in which the inlet and outlet ports of the valve are positioned at an angle of 90° to each other.

For many purposes it is found desirable to position the inlet and outlet port connections so that they will be axially aligned, and it is a particular object of the present invention to provide a construction along the lines of my copending application in which said inlet and outlet ports will be so axially aligned.

In accomplishing this object the plunger valve member is preferably made of tubular form so as to carry the inlet port or connection and this valve connection is preferably provided with a handle means, by which it may be conveniently elevated from its seat.

The accompanying drawing shows one embodiment of the various possible embodiments of the present invention to which the invention is not restricted.

In the drawing,

Fig. 1 is a side view of one embodiment of the preferred valve device of the present invention, Fig. 2 is a longitudinal sectional view upon an enlarged scale, Figs. 3 and 4 are enlarged cross sectional views similar to Fig. 2 illustrating the top and bottom of the valve construction when the valve is elevated from its seat, the section of Fig. 4 being taken at a right angle to the section of Fig. 2, Figs. 5 and 6 are perspective views upon an enlarged scale of the reciprocating inlet port nipple and the attachment clip for the manually actuating handle, Fig. 7 is a top view of the valve structure.

Referring to Figs. 1 to 7, the valve is preferably formed of a main body member A, cap member B, and a plunger member C, all of which may be formed of plastic moldings, such as of hard rubber, of phenolformaldehyde resins, or of other suitable materials.

Referring to Fig. 2, the body A may be of cylindrical, hexagonal, octagonal and other shapes, the cylindrical shape being illustratively shown in the drawing, and is provided with a cup-shaped cavity 10 which is interiorly threaded at 11 to receive the cap member B. The body A preferably carries one liquid flow nipple 13, which is desirably molded integrally therewith, while the plunger C preferably carries another nipple 12, the lower tubular extension 20 of which is threaded, as indicated at 50, to fit into a tapped socket at 51 in the body of the plunger member C. The bores 14 of the plunger nipple 12 and valve body nipple 13 are preferably of the same diameter. The ends of the nipples are provided with the mushroom enlargements 15 and they also, if desired, may be threaded to receive suitable liquid conduits or rubber hose connections.

According to the preferred use of the valve of the present invention, the nipple 12 serves as an inlet nipple and, if desired, may be inserted into the stopper or cork of a bottle, while the nipple 13 serves as an outlet nipple and may be suitably connected with a liquid conduit.

The bottom of the interior chamber 10 is provided with a cylindrical portion 16 of reduced diameter, which begins with the inwardly converging portion 17, as indicated.

At the bottom of the reduced diameter portion 16 is a shoulder 18 which receives the annular disk or valve seat member 19, adapted to contact with the valve member C.

The valve member C is provided with the extension 21 carrying the tapped socket 51. The extension is exteriorly of frusto-conical shape to extend into and receive in liquid-tight fashion the lower end of the rubber tube 23 which encircles the tubular stem 20.

Beyond the enlargement 21 the valve member C is provided with a cylindrical portion 25 which terminates in a seating portion 26, the terminal end of which is provided with a recess 27 to form an annular lip or edge 28, which is pressed against and closely contacts with the washer 19. The bore 54 of the valve stem 20 communicates with the bore 14 of the nipple 13 by means of the transverse bore 55 in the valve member C.

The other side of the rubber or collapsible tube 23 is stretched onto the frusto-conical nipple 29. The cap member B is also provided with an enlarged threaded portion 32 which cooperates with the threaded portion 11 of the member A, the end of the cap B being provided with a flange or ledge 35 which is adapted to press the gasket 33 against the top 34 of the cup member A, as indicated.

The cap member B is provided with a recess 36 and with the bore 37 which receive the outward extension of the tubular stem 20. The tubular stem 20 beyond the cap B is provided with the enlargements 53 preferably integrally molded therewith, which enlargements are provided with slots 38, into which fit the spring extension fingers 39 of the clip 40. The ends of the spring fingers 39 are turned over, as indicated at 56, to provide convenient finger contact portions, and the annulus 40 forming the base of the clip may be readily placed upon the valve stem, shown best in Fig. 3, before the stem is screwed into the tapped socket 51 of the valve, the diverging mount 57 of the slots 38 guiding the fingers 39 with their turned over ends 56 into position.

The handle 45 is provided with a horizontal extension 58, the forward portion of which is provided with a recess 59 (see particularly Fig. 7), the sides of the recess forming the forwardly directed fingers 60. These fingers 60 fit under the enlargements 53 (see also Fig. 5), and enable the valve stem 20 together with the valve C to be raised from its seat, as indicated in Figs. 3 and 4.

The cap B is preferably provided with a clevised extension 43 between which extends the handle 45, as shown best in Figs. 1, 2, and 7, to which the handle 45 is pivotally connected by the pin 44 and the upturned ears 61. The end of the handle 45 is concaved, as indicated, so that it may be conveniently pressed down by the finger or hand against the cylindrical body of the valve member A and enable opening of the valve C.

As shown in Fig. 2, when the valve F is in lowered position, the finger contact portions 56 of the clip 40 will be held to press within the slots 38 by the sides of the socket or recess 36 in the cap member B. However, when the valve stem 20 is elevated, elevating the valve C, these spring contact portions will spring outwardly and they will lock against the top portion 62 of the top of the cap member B. By this locking action of the contact portion 56 the valve may be kept open, as long as desired. When it is desired to close the valve, the two contact portions 56 may be pressed together by the fingers, whereupon they will readily slide down into the slots 38 between the enlargements 53 on the side of the valve stem 20 permitting the valve C to return to its seat.

It will be noted that the valve C is returned to its seat 19 by the coil spring 46 which reacts between the inside face 47 of the extension 21 and the inside face 48 of the nipple 29. The spring 46 serves to bias the lip 28 of the valve plunger member C against the valve seat 19 at all times when the lever 45 is not actuated to lift the valve C from its seat.

The operation of the device is readily apparent. By manipulating the lever 45 it is possible to permit flow of fluid from the nipple 12 to the nipple 13, from a bottle or conduit to another outlet conduit as may be desired. The only metal part, namely, the spring 46, is completely enclosed and protected by the rubber tube 23 and by the tube 20.

In the construction, as shown, it is assumed that the valve C will accurately and certainly seat without leakage since it will be guided against its seat by the interior dished portion 17 of the lower end of the body A.

Instead of the clevised connection 60—60, the end of the lever 45 may be pivotally connected by a pin to the valve stem 20.

A particular feature of the present invention resides in the fact that the valve elements are constructed of materials inert to medicinal liquids, such as salt solutions useful for douches, irrigations and so forth, for example, in connection with nose and throat ailments, wounds, vaginal and rectal purposes. It will be noted that the nipple 12 may be directly inserted into the stopper or outlet orifice of a container or bottle.

The size may widely vary, as for example, from approximately 2½ inches in length and 1 inch in diameter, 20 inches in length and 10 inches in diameter.

The coil spring 46 will reinforce the tube 23 against collapsing under pressure. The tube 23 may be attached additionally to the frusto-conical elements 21 and 29 by an inert adhesive, if desired.

The valve of the present invention does not expose any metal parts to the action of any liquids which may be passed therethrough, and it therefore may be very conveniently employed with corrosive liquids, such as acids, alkalies, and a wide variety of solutions of chemical compounds.

The operation of the valve may be controlled so that the operator will obtain either a drop at a time or a continuously flowing stream. The operator may conveniently lock it in open position by the use of the catch shown in Fig. 6, the operation of which is illustrated in Figs. 2 and 3.

The valve as illustrated has been designed for use on fountain syringes, nozzle syphons, laboratory dispensing apparatus, and other places where a control flow will add to the efficiency and safety.

The design is such that it may readily be adapted to larger sizes and greater pressure so that it is suitable for widespread industrial uses. Moreover, it does not require any special manipulation and its operation is apparent to those who are not adept in mechanics. It will not leak even though it is permitted to stand for a long while and it has a most attractive appearance so that it will be an asset to the merchandise to which it is affixed.

What is claimed is:—

1. A valve device adapted to be utilized for corrosive and/or medicinal liquids, comprising a body member, a cap member and a shouldered valve plunger member, all of which are molded of a plastic corrosive-resistant material, said valve device having an inlet and an outlet nipple at its respective end portions, the main portion of said body member having a cylindrical bore and having the form of a cup, the outer edge of which is threaded to receive the cap member, the lower portion of the interior of said cup being provided with a portion of diameter which forms a shoulder adjacent the inlet to the outlet nipple, a pliable annular valve seat member seated upon said shoulder to cooperate with said valve plunger, a resilient metallic coil spring extending between said cap member and the shoulder of said plunger member serving to press said plunger toward said valve seat member and a pliable non-corrodible enclosure for said coil spring, and a resilient lock means provided to lock the valve plunger member in open position, said lock means being provided with a resilient finger having a cam portion to catch on the cap member to hold the valve plunger member open, said valve plunger member being returnable under force of said coil spring when said cam portion is manually released.

2. A valve device adapted to be utilized for corrosive and/or medicinal liquids, comprising a body member, a cap member and a shouldered valve plunger member, all of which are molded of a plastic corrosive-resistant material, said valve device having an inlet and an outlet nipple at its respective end portions, the main portion of said body member having a cylindrical bore and having the form of a cup, the outer edge of which is threaded to receive the cap member, the lower portion of the interior of said cup being provided with a portion of diameter which forms a shoulder adjacent the inlet to the outlet nipple, a pliable annular valve seat member seated upon said shoulder to cooperate with said valve plunger, a resilient metallic coil spring extending between said cap member and the shoulder of said plunger member serving to press said plunger toward said valve seat member and a pliable non-corrodible enclosure for said coil spring, said valve plunger member being of tubular form and projecting outside of said body member and said cap member, the outwardly projecting portion of said valve plunger member serving as the inlet nipple, and the valve plunger member being provided with an opening to permit communication between the interior of the valve plunger member and the interior of the body member.

3. A valve device adapted to be utilized for corrosive and/or medicinal liquids, comprising a body member, a cap member and a shouldered valve plunger member, all of which are molded of a plastic corrosive-resistant material, said body member taking the form of a cylinder with an outlet at its bottom, the main portion of said body having a cylindrical bore and having the form of a cup, a pliable valve seat member seated in the bottom of said cup; and said valve plunger member comprising a tubular stem extension projecting through said cup member, the end of which extension forms an inlet to said body member, the inner end of said plunger member taking the form of an annular lip to contact with said valve seat member, a resilient metallic coil spring extending between said cap member and the shoulder of said plunger member serving to press said plunger toward said valve seat member and a pliable non-corrodible enclosure for said coil spring.

4. A valve device adapted to be utilized for corrosive and/or medicinal liquids, comprising a body member, a cap member and a valve plunger member, said body member taking the form of a cup, provided with an outlet, the lower portion of said cup being provided with a shoulder adjacent the outlet and a pliable annular valve seat member seated on said shoulder; said valve plunger member being provided with a tubular stem projecting out of said cup-shaped body and being provided with an annular lip to contact with said valve seat member; said cap member being provided with a central opening through which said stem projects outwardly of the main cup-shaped body; a resilient member reacting between said plunger member and said cap, a rubber tube enclosed within said cup-shaped body in turn enclosing said resilient member; and a handle having a clevis connection to said stem member and a pivotal connection to said cap member, whereby the valve may be lifted from said seat against the force of said resilient member.

5. A valve device adapted to be utilized for corrosive and/or medicinal liquids, comprising a body member, a cap member and a valve plunger member, said body member having an outlet and taking the form of a cup, the outer edge of which receives the cap member, the lower portion of said cup-shaped body member being provided with a shoulder adjacent the outlet and a pliable annular valve seat member at said outlet; said valve plunger member being provided with a tubular stem projecting out of said body member and cap member and having an annular lip to contact with said valve seat member; said cap member being provided with a central opening through which said stem projects outwardly of the main cup-shaped body member, said body member also being provided with a rubber encased coil spring reacting between the said cap and said plunger member; and a handle pivotally mounted on said cap member and engaging said stem, whereby the valve plunger member may be lifted from said seat against the force of said coil spring.

6. A valve device comprising an elongated casing, an outlet nipple extending from one end, an inlet nipple extending from the other end, said inlet nipple extending into the casing and being provided with a valve at its innermost end and the casing adjacent the outlet nipple being provided with a valve seat therefor, said inlet nipple on its portion which extends into the casing being shouldered and encircled by a coil spring reacting at one end against said casing and at the other end against said shoulder to press the valve against said valve seat the passage through the inlet nipple extending to below said shoulder and opening into the interior of said casing between said shoulder and said valve and a rubber tube enclosing said coil spring and extending between and connected to said casing and said shoulder, said connections being formed by rubber tube receiving elements of slightly larger diameter than the ends of said rubber tube over which the ends of the rubber tube are stretched to form liquid tight connections.

7. A valve device comprising an elongated casing, inlet and outlet nipples extending from said casing, a valve and a valve seat cooperating therewith within said casing, resilient means to press said valve against said valve seat and cut off communication between the inlet and outlet nipples, tubular plunger means for actuating said valve and manual operating means connected to said plunger means, said casing consisting of a body and a cap, said inlet nipple and said plunger being formed as a single unit and extending through an opening in said cap and a flexible tubular rubber enclosure for said plunger means to protect the opening in said cap and prevent leakage therethrough.

8. A valve member comprising an elongated casing, inlet and outlet nipples extending from said casing, a valve and a valve seat cooperating therewith within said casing, resilient means to press said valve against said valve seat and cut off communication between the inlet and outlet nipples, plunger means extending through said casing for actuating said valve and manual operating means connected to said plunger means, and locking means automatically actuated on opening of said valve to lock said valve in open position and manually actuated to permit said valve to close under the action of said resilient means, said locking means including a base connected to and moving with said plunger means when the valve is opened, and spring finger means attached to said base, the outer portions of which spring finger means are provided with outstanding cam portions, which abut against the end of said casing when said valve is opened by said plunger means and must be pressed inwardly to eliminate said abutment to permit closure of said valve.

9. A valve member comprising an elongated casing, inlet and outlet nipples extending from said casing, a valve and a valve seat cooperating therewith within said casing, resilient means to press said valve against said valve seat and cut off communication between the inlet and outlet nipples, plunger means extending through said casing for actuating said valve and manual operating means connected to said plunger means, and locking means to lock said valve in open position including a spring finger connected to move with said valve having a cam portion cooperating with said casing to maintain the valve in open position, said cam portion being manually releasable to permit return of said valve under influence of said resilient means, said locking means including a base connected to and moving with said plunger means when the valve is opened, and spring finger means attached to said base, the outer portions of which spring finger means are provided with outstanding cam portions, which abut against the end of said casing when said valve is opened by said plunger means and must be pressed inwardly to eliminate said abutment to permit closure of said valve.

ROBERT H. GIBBS.